(12) United States Patent
Babin et al.

(10) Patent No.: US 7,168,941 B2
(45) Date of Patent: *Jan. 30, 2007

(54) THERMAL SEAL BETWEEN MANIFOLD AND NOZZLE

(75) Inventors: Denis Babin, Ontario (CA); Craig Renwick, Ontario (CA); Robert Sicilia, Ontario (CA); Helen Verriet, Ontario (CA)

(73) Assignee: Mold-Masters Limited, Georgetown (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/067,660

(22) Filed: Feb. 28, 2005

(65) Prior Publication Data

US 2005/0142247 A1    Jun. 30, 2005

Related U.S. Application Data

(63) Continuation of application No. 10/357,420, filed on Feb. 4, 2003, now Pat. No. 6,860,732.

(60) Provisional application No. 60/353,212, filed on Feb. 4, 2002.

(51) Int. Cl.
*B29C 45/20*  (2006.01)

(52) U.S. Cl. ............... 425/549; 264/328.15; 425/572

(58) Field of Classification Search ........... 425/549, 425/572; 264/328.15
See application file for complete search history.

(56) References Cited

U.S. PATENT DOCUMENTS

| 3,822,856 | A | 7/1974 | Gellert |
|---|---|---|---|
| 4,013,393 | A | 3/1977 | Gellert |
| 4,026,518 | A | 5/1977 | Gellert |
| 4,330,258 | A | 5/1982 | Gellert |
| 4,468,191 | A | 8/1984 | Gellert |
| 4,576,567 | A | 3/1986 | Gellert |
| 4,579,520 | A | 4/1986 | Gellert |
| 4,588,367 | A | 5/1986 | Schad |
| 4,662,837 | A | 5/1987 | Anderson |
| 4,666,396 | A | 5/1987 | Shaw |
| 4,669,971 | A | 6/1987 | Gellert |
| 4,682,945 | A | 7/1987 | Schad |
| 4,777,348 | A | 10/1988 | Gellert |
| 5,032,078 | A | 7/1991 | Benenati |
| 5,125,827 | A | 6/1992 | Gellert |
| 5,227,179 | A | 7/1993 | Benenati |
| 5,269,676 | A | 12/1993 | Gellert |
| 5,478,230 | A | 12/1995 | McGrevy |
| 5,499,916 | A | 3/1996 | Schad et al. |
| 5,507,637 | A | 4/1996 | Schad et al. |
| 5,518,389 | A | 5/1996 | Nonomura et al. |

(Continued)

FOREIGN PATENT DOCUMENTS

CA    1153523    9/1983

(Continued)

*Primary Examiner*—Tim Heitbrink
(74) *Attorney, Agent, or Firm*—Medler Ferro PLLC

(57) ABSTRACT

A seal is provided between a nozzle and a manifold. The seal provides a melt channel between an outlet of the manifold and a nozzle channel. The seal has higher thermal expansion coefficient than both the nozzle and the manifold to provide an improved seal between the manifold and the nozzle when the injection molding apparatus is at an operating temperature.

12 Claims, 15 Drawing Sheets

U.S. PATENT DOCUMENTS

| | | |
|---|---|---|
| 5,533,882 A | 7/1996 | Gessner et al. |
| 5,609,893 A | 3/1997 | Eastwood |
| 5,759,595 A | 6/1998 | Gunther |
| 5,896,640 A | 4/1999 | Lazinski et al. |
| 6,062,846 A | 5/2000 | Kalemba |
| 6,261,084 B1 | 7/2001 | Schmidt |
| 6,309,207 B1 | 10/2001 | Kalemba |
| 6,331,106 B1 | 12/2001 | Helldin |
| 6,713,002 B2 | 3/2004 | Kazner et al. |
| 6,860,732 B2 * | 3/2005 | Babin et al. ............ 425/549 |
| 2001/0011415 A1 | 8/2001 | Kalemba |

FOREIGN PATENT DOCUMENTS

| | | |
|---|---|---|
| EP | 0 630 733 A1 | 12/1994 |
| EP | 0 885 707 A1 | 12/1998 |
| EP | 1 053 852 A1 | 11/2000 |
| WO | WO 01/81066 A1 | 11/2001 |
| WO | WO 01/87570 | 11/2001 |
| WO | WO 01/96089 A1 | 12/2001 |

* cited by examiner

THERMAL SEAL BETWEEN MANIFOLD AND NOZZLE

This application is a continuation of application Ser. No. 10/357,420 filed Feb. 4, 2003 now U.S. Pat. No. 6,860,732. This application also claims benefit of U.S. Provisional Application No. 60/353,212 filed on Feb. 4, 2002.

FIELD OF THE INVENTION

The present invention relates generally to an injection molding apparatus and, in particular, to an improved seal between a manifold and a nozzle.

BACKGROUND OF THE INVENTION

A common problem associated with hot runner injection molding systems is the leaking of molten plastic that can occur between the manifold and the nozzle. Leaking is typically caused by operation of the hot runner injection molding system outside of the designated operating window. There are many different nozzle designs of the prior art that attempt to stop leakage from occurring.

A pair of spacers located between a manifold and a cover plate or a hot runner plate, such as disclosed in U.S. Pat. Nos. 6,309,207, 6,062,846 and U.S. patent application Ser. No. 2001/0011415, apply a contact pressure between the nozzle body melt channel and the manifold melt channel to achieve a seal therebetween. The spacers are arranged in series with a first spacer abutting the manifold and a second spacer abutting the cover plate. The second spacer has a different response characteristic to compressive pressures than the first spacer.

WO 01/87570 A1 discloses a non-flat sealing interface, which is provided between a nozzle and a manifold. A spring urges the nozzle against the manifold to produce a pressure distribution with a peak sealing pressure that occurs adjacent the nozzle and manifold melt channels. Similarly U.S. Pat. No. 5,896,640 discloses a sealing insert that abuts a nozzle shoulder. The sealing insert generates an angular sealing force and maintains sealing contact between the nozzle and manifold channels. The sealing insert produces a peak sealing pressure that occurs adjacent the nozzle and manifold channels.

It is an object of the present invention to provide a novel thermal seal for reducing the leakage between a manifold and a nozzle.

SUMMARY OF THE INVENTION

According to one aspect of the present invention there is provided an injection molding apparatus comprising:

a manifold having a manifold channel, the manifold channel having an inlet for receiving a melt stream of moldable material and an outlet for delivering the melt stream to a nozzle channel of a nozzle;

a sealing element provided between the nozzle and the manifold, the sealing element including a melt channel for receiving the melt stream from the outlet of the manifold channel and delivering the melt stream to the nozzle channel; and a mold cavity for receiving the melt stream from the nozzle channel, the nozzle channel communicating with the mold cavity through a mold gate;

wherein the sealing element has a higher thermal expansion coefficient than both the nozzle and the manifold.

According to another aspect of the present invention there is provided an injection molding apparatus comprising:

a manifold having a manifold channel for receiving a melt stream of moldable material under pressure;

a manifold plug provided in the manifold, the manifold plug having a manifold plug channel formed therein, the manifold plug channel having an inlet for receiving the melt stream from the manifold channel and an outlet for delivering the melt stream to a nozzle channel of a nozzle; and a mold cavity for receiving the melt stream from the nozzle channel, the nozzle channel communicating with the mold cavity through a mold gate;

wherein the manifold plug has a higher thermal expansion coefficient than both the nozzle and the manifold.

According to yet another embodiment of the present invention there is provided an injection molding apparatus comprising:

a manifold having a manifold channel, the manifold channel having an inlet for receiving a melt stream of moldable material under pressure and an outlet;

a nozzle having nozzle body and a nozzle head, the nozzle head being located adjacent an outlet surface of the manifold, the nozzle having a nozzle channel for receiving the melt stream from the outlet of the manifold channel; and a mold cavity for receiving the melt stream from the nozzle channel, the nozzle channel communicating with the mold cavity through a mold gate;

wherein at least a portion of the nozzle head has a higher thermal expansion coefficient than both the nozzle body and the manifold.

The present invention provides advantages in that the sealing element provides a continuous sealed melt channel between the manifold and the nozzle to minimize leakage at the connection therebetween.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
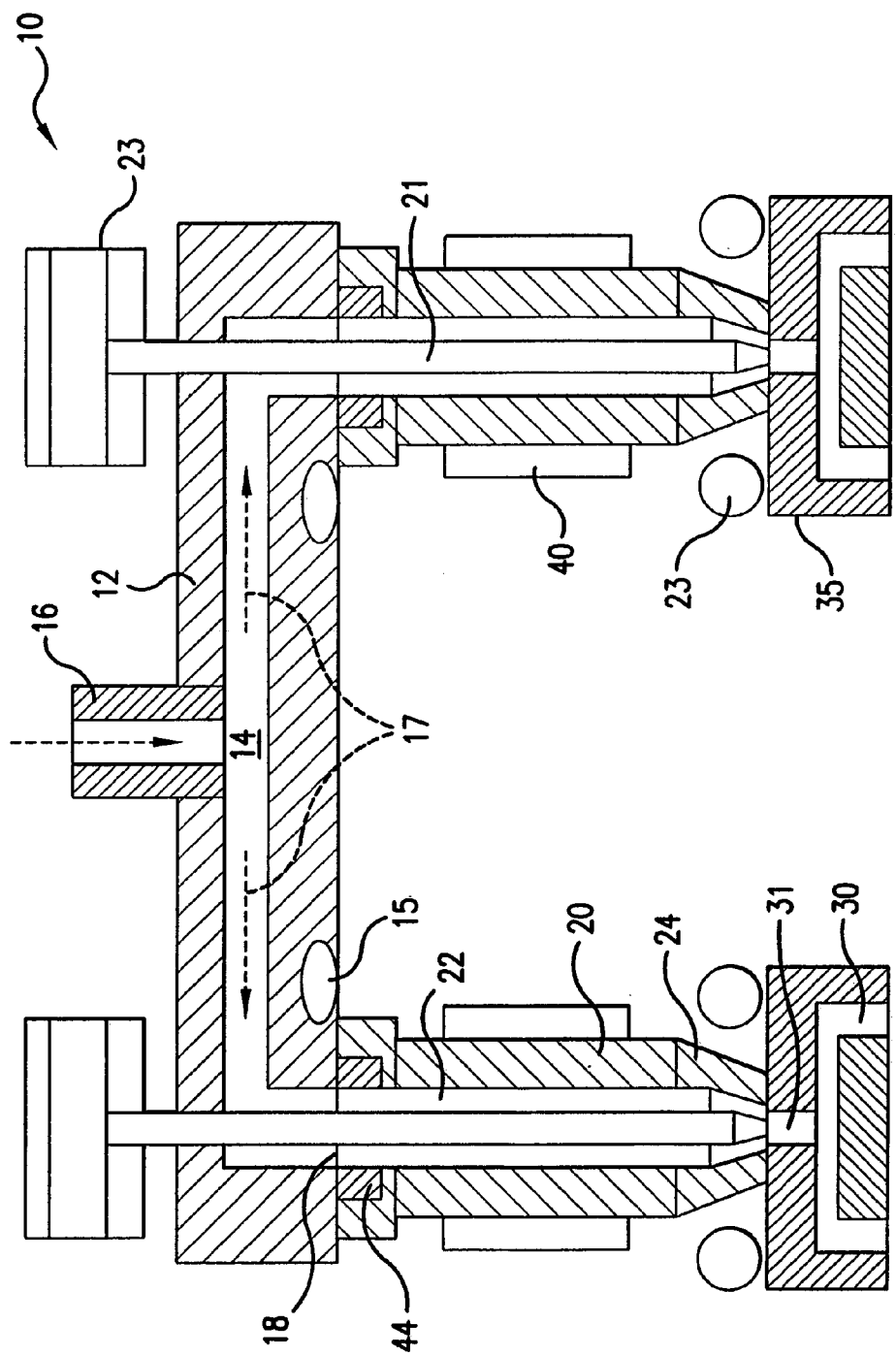
FIG. 1 is a side sectional view of a first embodiment of an injection molding apparatus of the present invention.

Referring now to FIG. 1, an injection molding apparatus is generally indicated by reference numeral 10. The injection molding apparatus comprises a manifold 12 having a manifold channel 14 extending therethrough. A manifold bushing 16 that is located at an inlet of the manifold channel 14 receives a melt stream of moldable material from a machine nozzle (not shown). The melt stream flows through the manifold channel 14 and is delivered to outlets 18, as indicated by the arrows 17. Manifold heaters 15 are provided in the manifold 12 to maintain the melt stream at a desired temperature.

Nozzles 20 are located between the manifold 12 and respective mold cavities 30, which are formed in mold cavity plates 35. Each nozzle 20 includes a nozzle channel 22 for receiving the melt stream from the respective manifold outlet 18 and delivering the melt stream to the respective mold cavity 30. Mold gates 31 are provided at the entrance to the mold cavities 30, adjacent tips 24 of the nozzles 20. Each nozzle 20 includes a valve pin 21 that is driven by a valve piston 23. The valve pins 21 are selectively movable to open and close the respective mold gates 31. Each nozzle 20 is further provided a heater 40, which helps to maintain the melt stream at a desired temperature as it passes through the nozzle 20. Cooling channels 33 are located adjacent the mold cavities 30 in order to aid in the cooling thereof.

The injection molding apparatus 10 of FIG. 1 further includes a sealing element or a sealing insert 44 that is located between the nozzle 20 and the manifold 12. The sealing insert will be described in more detail in relation to FIGS. 2 to 7. In each of the following injection molding apparatus embodiments, like reference numerals represent like parts.

Figure 2:
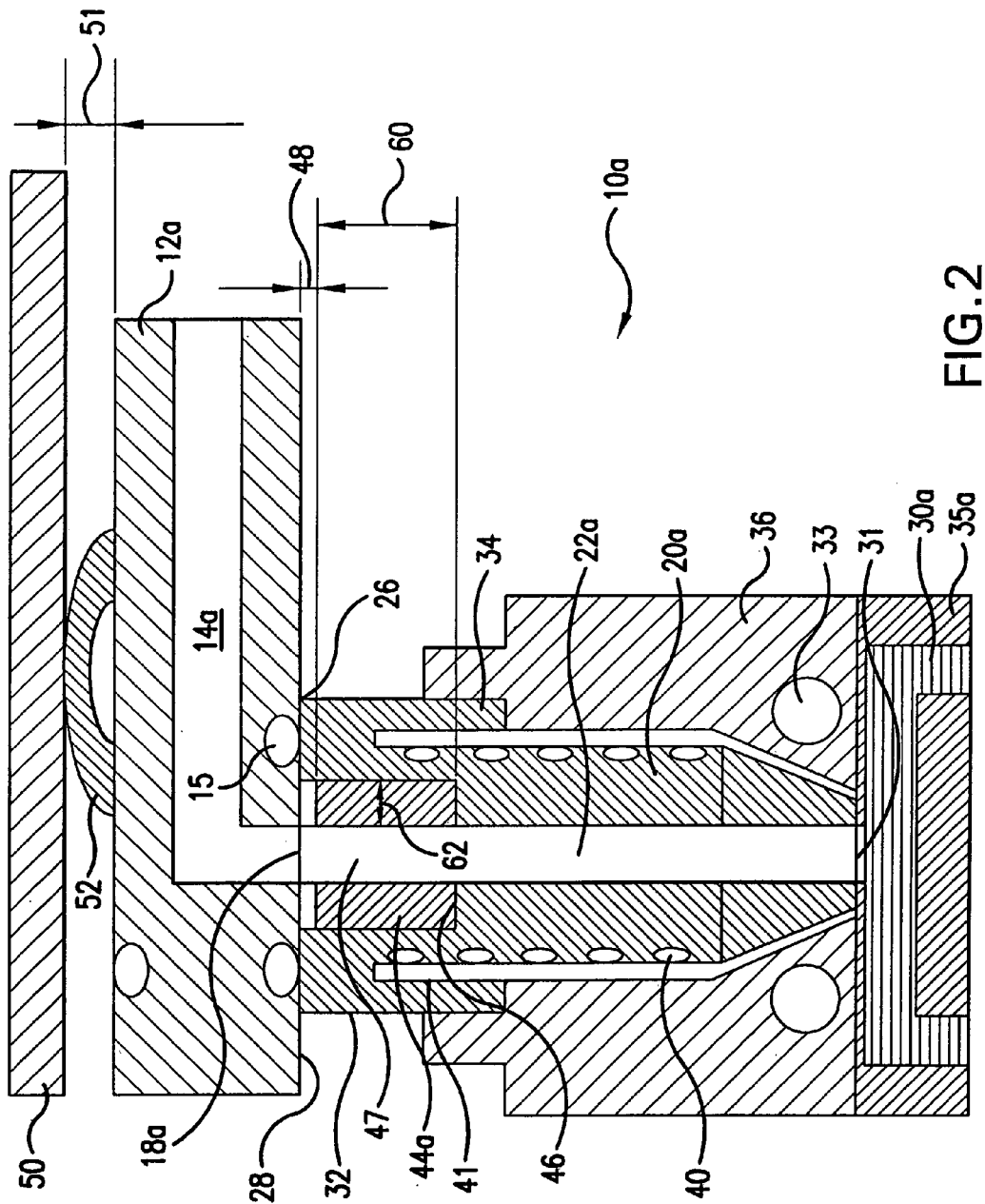
FIG. 2 is a side sectional view of parts of an injection molding apparatus of a further embodiment of the present invention.

Referring to FIG. 2, another embodiment of an injection molding apparatus 10a is shown. In this embodiment, a manifold plate 36 abuts the mold cavity plate 35a.

A nozzle shoulder 32 is provided at an upper end of the nozzle 20a. The nozzle shoulder 32 includes an upper surface 26, which abuts an outlet surface 28 of a manifold 12a. The nozzle shoulder 32 includes a downwardly directed spacing flange 34 that is supported by the manifold plate 36.

A backing plate 50 is located adjacent the manifold 12a and is offset by a gap 51. A spring 52 is provided between the backing plate 50 and the manifold 12a. The spring 52 may alternatively be a rigid spacer. The spring 52 absorbs movement of the manifold 12a caused as a result of thermal expansion, which occurs when the manifold 12a and nozzle 20a heat up to the operating temperature range.

The nozzle 20a further includes a recess 41 that is formed in an upper surface 26, or manifold contacting surface, of the nozzle 20a. The depth of the recess 41 is delimited by a shoulder 46. A sealing insert 44a, which is generally a sleeve having a bore 47, is nested in the recess 41. The melt stream flows through the bore 47 from a manifold outlet 18a and into nozzle channel 22a. The sealing insert 44a has a length 60 and a wall thickness 62. The wall thickness 62 is typically in the range of 2 to 3 mm. The sealing insert 44a and manifold 12a are arranged so that a cold clearance, indicated at 48, is provided between the sealing insert 44a and the manifold 12a.

The sealing insert 44a has a higher thermal conductivity than both the manifold 12a and the nozzle 20a, which are typically comprised of tool steels such as H13 or P20 steel, for example. The sealing insert 44a may be comprised of copper, beryllium copper, brass, carbide or some steels. Alternatively, any suitable material having a higher thermal conductivity than the manifold 12a and nozzle 20a may be used.

Figure 3:
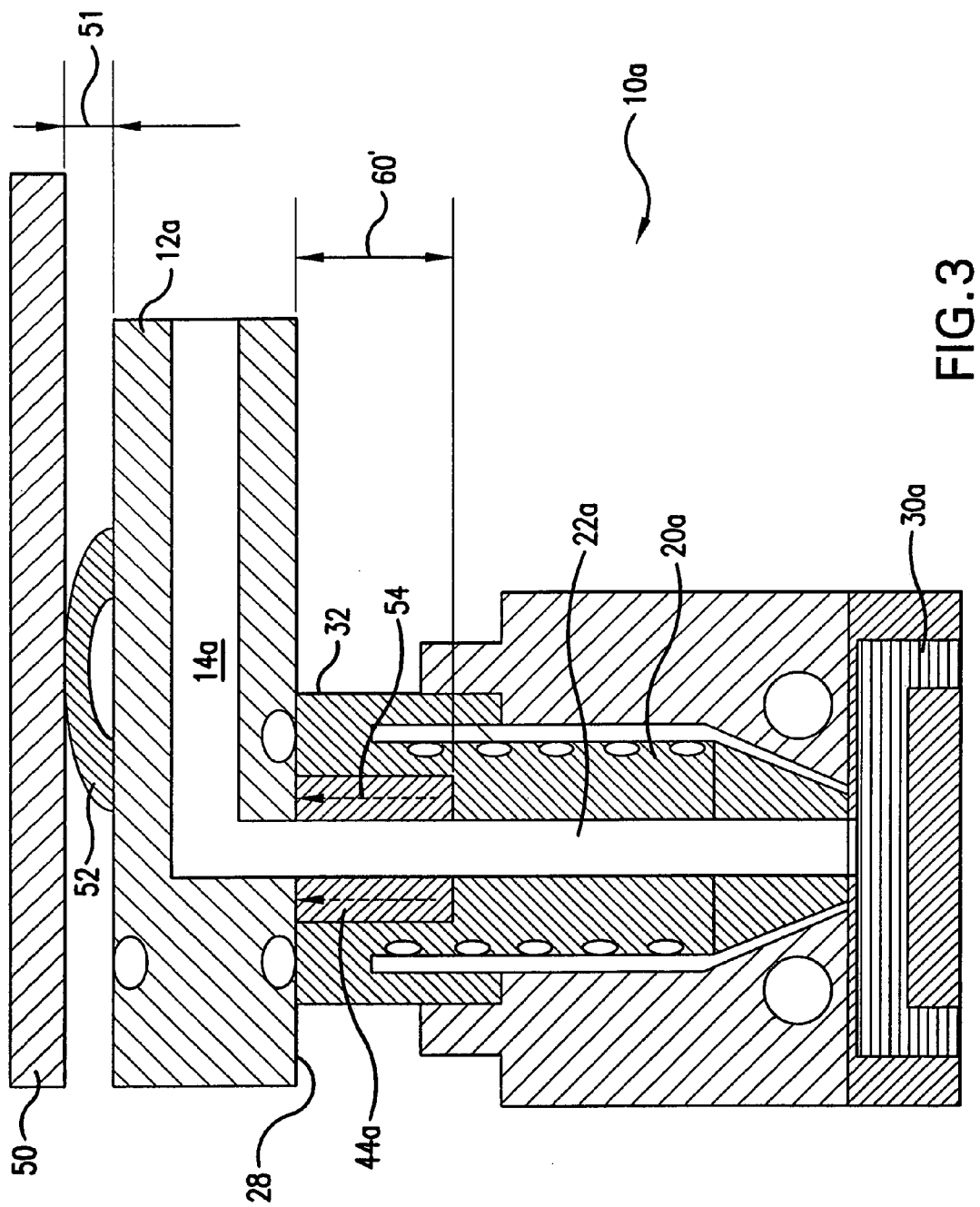
FIG. 3 is a side sectional view of the injection molding apparatus of FIG. 2 in an operating condition.

FIG. 2 shows the injection molding apparatus 10a in a cold, or non-operating, condition, in which the apparatus 10a is below an operating temperature. This condition occurs prior to operation of the injection molding apparatus 10a. Referring to FIG. 3, the injection molding apparatus 10a is shown in the operating condition, in which the temperature of the injection molding apparatus 10a is in an operating temperature range. As shown, the sealing insert 44a has lengthened to remove the cold clearance 48 and impart a sealing force, as indicated by arrows 54, on the outlet surface 28 of the manifold 12a.

In operation, the injection molding apparatus 10a starts in the cold condition of FIG. 2, in which all of the components are at generally the same ambient temperature. During operation, the manifold 12a having a manifold channel 14a and the nozzle 20a having nozzle channel 22a are heated and then maintained at their respective temperatures so that the melt stream may flow unhindered into the melt cavity 30a, which is chilled. The nozzle 20a and manifold 12a must maintain tight alignment with each other while in the operating temperature range. The manifold 12a and the nozzle 20a may be subject to different amounts of heat expansion, particularly if they are comprised of different materials. In the injection molding apparatus of FIG. 2, the manifold 12a is allowed to have a lateral displacement relative to the nozzle 20a because the nozzle 20a is not coupled to the manifold 12a by a fastener.

As the manifold 12a heats up to operating temperature, the nozzle 20a is heated by contact with the manifold 12a and also by heater 40. Due to heat expansion, the manifold 12a applies pressure to nozzle 20a and the spring 52. At the same time, due to the heat expansion of the nozzle 20a, the nozzle 20a applies pressure to the outlet surface 28 of the manifold 12a. As a result, the spring 52 compresses to avoid damage to the manifold 12a and nozzle 20a. The sealing insert 44a also responds to the temperature increase by expanding more than the nozzle 20a and thus applying sealing force to the outlet surface 28 of the manifold 12a. Because the sealing insert 44a has a high thermal conductivity, the length 60 of the sealing insert 44a increases by a larger amount than the surrounding components. This is shown by length 60' in FIG. 3. The pressure applied to the manifold 12a by the sealing insert 44a is greater than the injection forces generated by the melt stream, which attempt to push the manifold 12a and nozzle 20a apart and create a clearance for the melt stream to leak under pressure.

The spring 52 is relatively stiff and compresses to reduce forces that may be large enough to damage the nozzle 20a or the manifold 12a. The spring 52 does not compress due to the sealing force applied by the sealing insert 44a. Instead, the sealing insert 44a is designed to at least partially collapse if the sealing force applied is too large. The sealing insert 44a is a relatively inexpensive component and therefore, is easily replaced if damaged.

It will be appreciated by a person skilled in the art that the length 60 and wall thickness 62 of the sealing insert 44a may be varied to suit the sealing requirements of a particular application.

Figure 4:
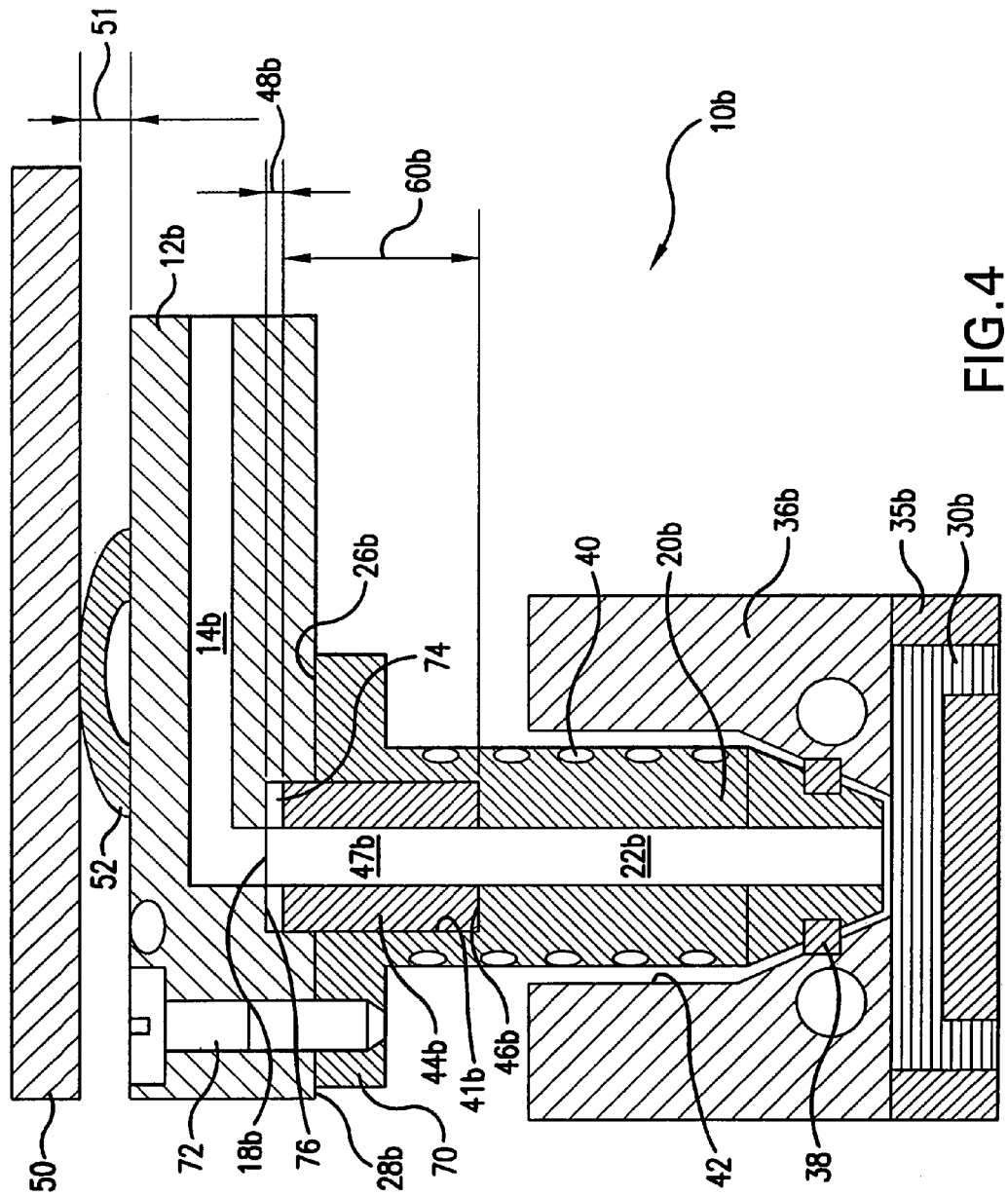
FIG. 4 is a side sectional view of parts of a further embodiment of an injection molding apparatus of the present invention.

Turning now to FIG. 4, another embodiment of an injection molding apparatus 10b is shown. The injection molding apparatus 10b is similar to the injection molding apparatus 10 and 10a of FIG. 1 and FIGS. 2 and 3, respectively. A nozzle 20b includes a shoulder flange 70 that extends outwardly from a top portion thereof. The shoulder flange 70 is coupled to a manifold 12b by a fastener 72. Additional fasteners 72 may be used, however, for simplicity only one is shown in the Figures.

A manifold plate 36b abuts a mold cavity plate 35b of mold cavity 30b and supports the nozzle 20b. The nozzle 20b engages mounting elements 38, which extend from the inner wall 42 of the manifold plate 36b, to locate the nozzle 20b and manifold 12b, which is fastened thereto, relative to the mold cavity plate 35b.

A first recess 41b having a shoulder 46b is formed in the upper surface 26b of the nozzle 20b. A second recess 74 having a shoulder 76 is formed in an outlet surface 28b of the manifold 12b. A sealing insert 44b having a bore 47b is nested in the recess 41b and extends beyond an upper surface 26b of the nozzle 20b through a portion of second recess 74. The melt stream flows through bore 47b of the sealing insert 44b from a manifold outlet 18b to a nozzle channel 22b.

The sealing insert 44b has a length 60b and is generally similar in construction to the sealing insert 44a of FIGS. 2 and 3. The sealing insert 44b and manifold 12b are arranged so that a cold clearance, indicated at 48b, is provided between the sealing insert 44b and the shoulder 76 of the manifold 12b.

Figure 5:
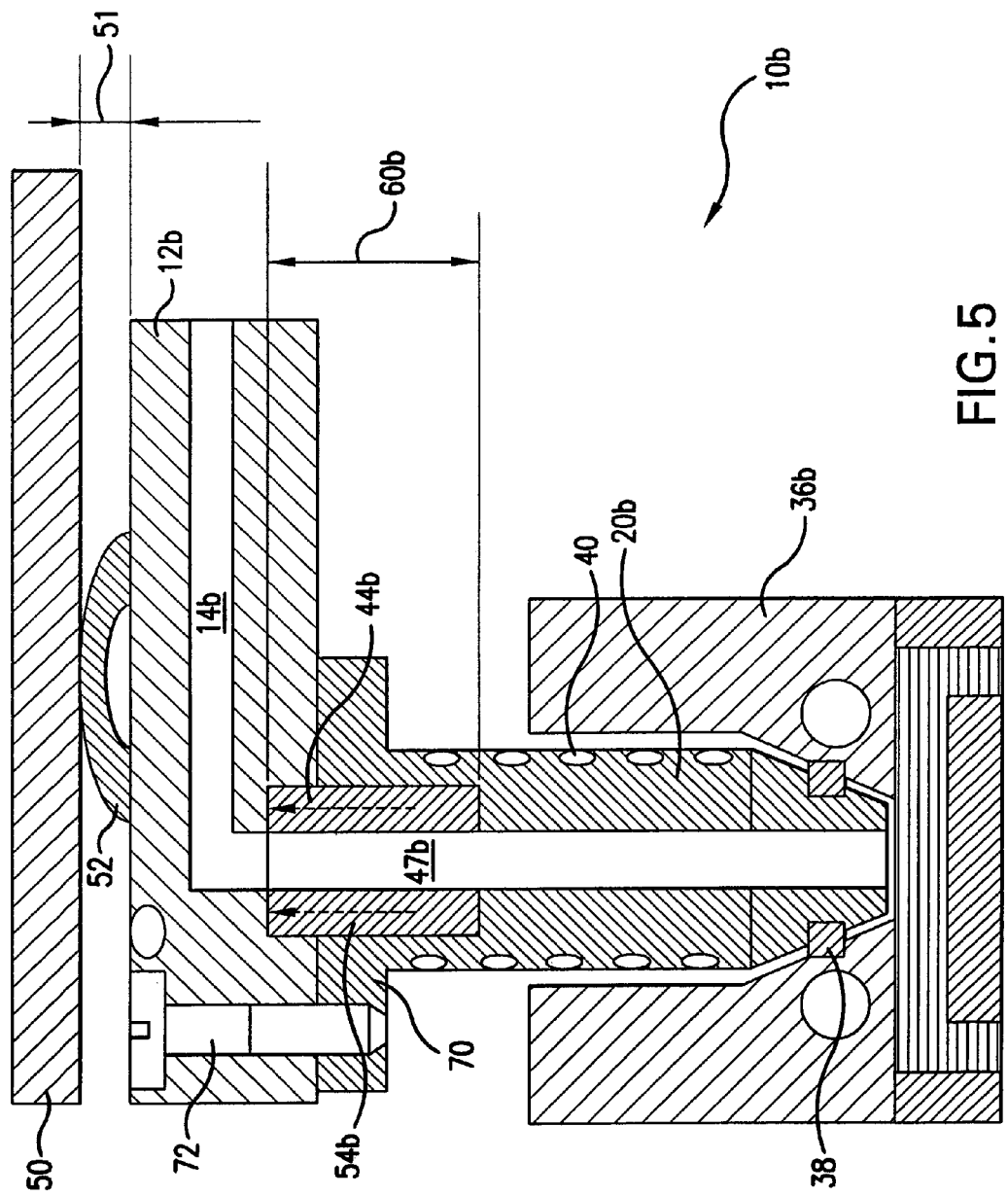
FIG. 5 is a side sectional view of the injection molding apparatus of FIG. 4 in an operating condition.

In operation, the injection molding apparatus 10b starts in the cold condition of FIG. 4 and is heated to the operating condition of FIG. 5, as has been described in relation to FIGS. 2 and 3. As the manifold 12b having a manifold channel 14b heats up to operating temperature, the nozzle 20b having a nozzle channel 22b is heated by contact with the manifold 12b and also by heaters 40. The fastener 72 typically expands along with the manifold 12b and nozzle 20b. The expansion of the manifold 12b and nozzle 20b assembly is absorbed by spring 52. Gap 51 is reduced so that damage to the manifold 12b and nozzle 20b is avoided.

At the same time, the sealing insert 44b expands and applies a sealing force, in the direction indicated by arrow 54b, to the manifold shoulder 76, as is shown in FIG. 5. Because the sealing insert 44b has a higher thermal conductivity than both the nozzle 20b and manifold 12b, the length 60b of the sealing insert 44b increases by a larger amount than the surrounding components. This is shown by length 60b' in FIG. 5. The pressure applied to the manifold shoulder 76 by the sealing insert 44b is greater than the injection forces of the melt stream, which attempt to push the manifold 12b and nozzle 20b apart.

The sealing insert 44b of the injection molding apparatus 10b additionally allows for location of the nozzle 20b relative to the manifold 12b. The sealing insert 44b projects beyond the upper surface 26b of the nozzle 20b so that the nozzle channel 20b can be aligned with the manifold outlet 18b.

Figure 6:
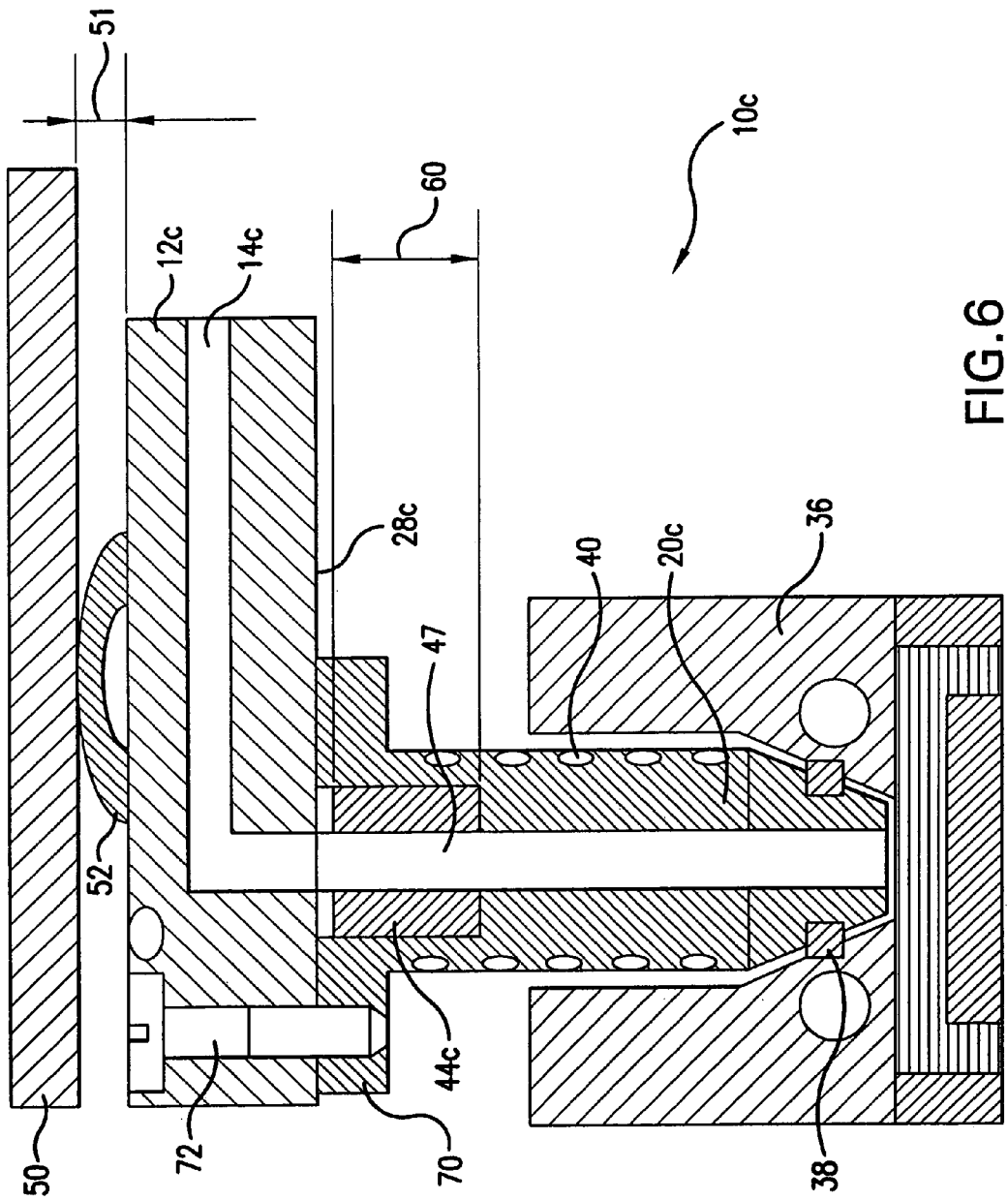
FIG. 6 is a side sectional view of parts of yet a further embodiment of an injection molding apparatus of the present invention.
Figure 7:
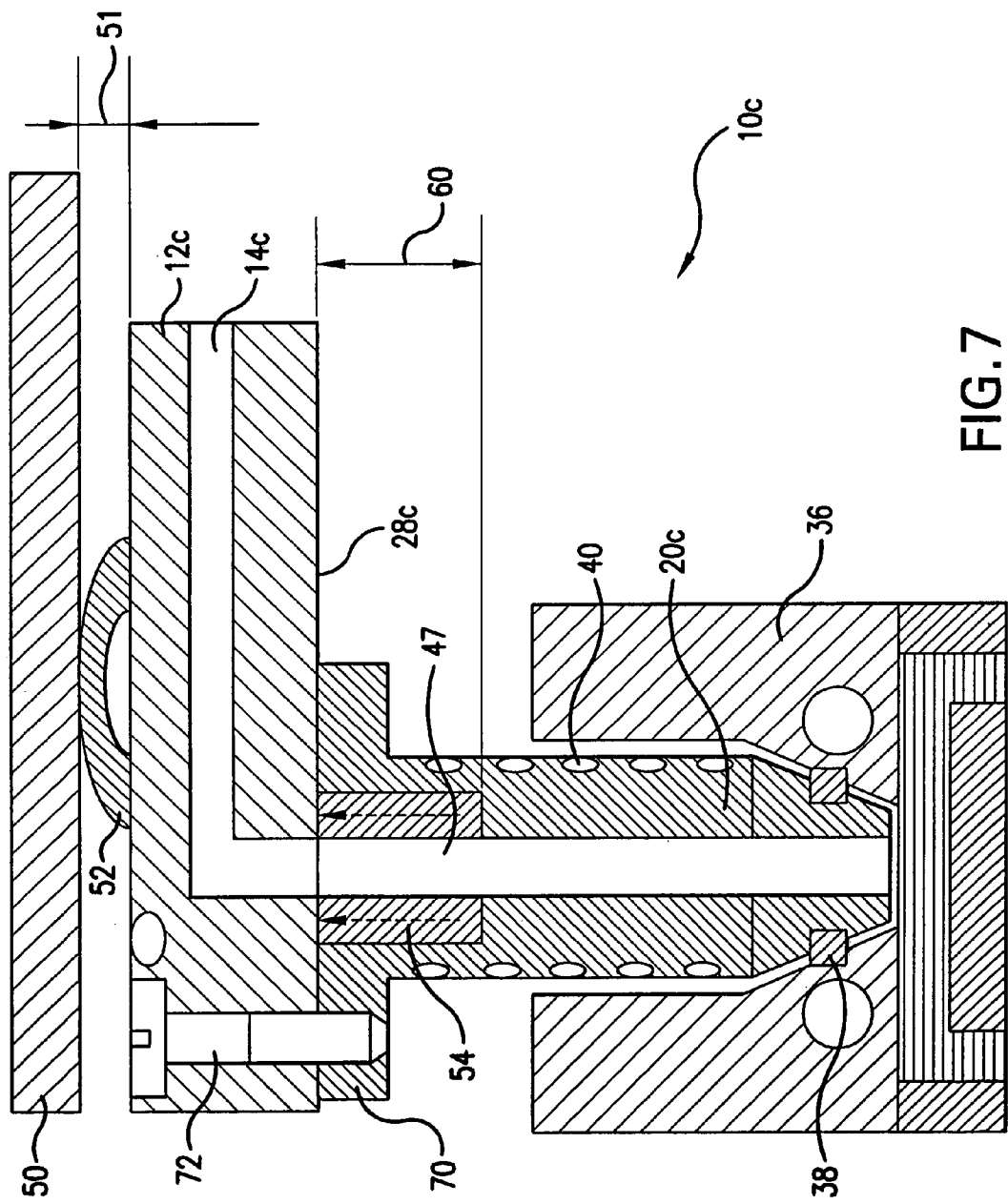
FIG. 7 is a side sectional view of the injection molding apparatus of FIG. 6 in an operating condition.

Turning now to FIGS. 6 and 7, another embodiment of an injection molding apparatus 10c is shown. The injection molding apparatus 10c is similar to the injection molding apparatus 10b of FIGS. 4 and 5, however, the injection molding apparatus 10c incorporates a sealing insert 44c similar to sealing insert 44a of FIGS. 2 and 3. A manifold 12c having a manifold channel 14c is similar to the manifold 12b of FIGS. 4 and 5, however, it has a flat outlet surface 28c and does not incorporate the second recess 74. Operation of the embodiment of FIGS. 6 and 7 need not be described in detail as the sealing action of the sealing insert 44c to reduce leakage between nozzle 20c and manifold 12c has generally been described in relation to FIGS. 1–5.

Figure 8:
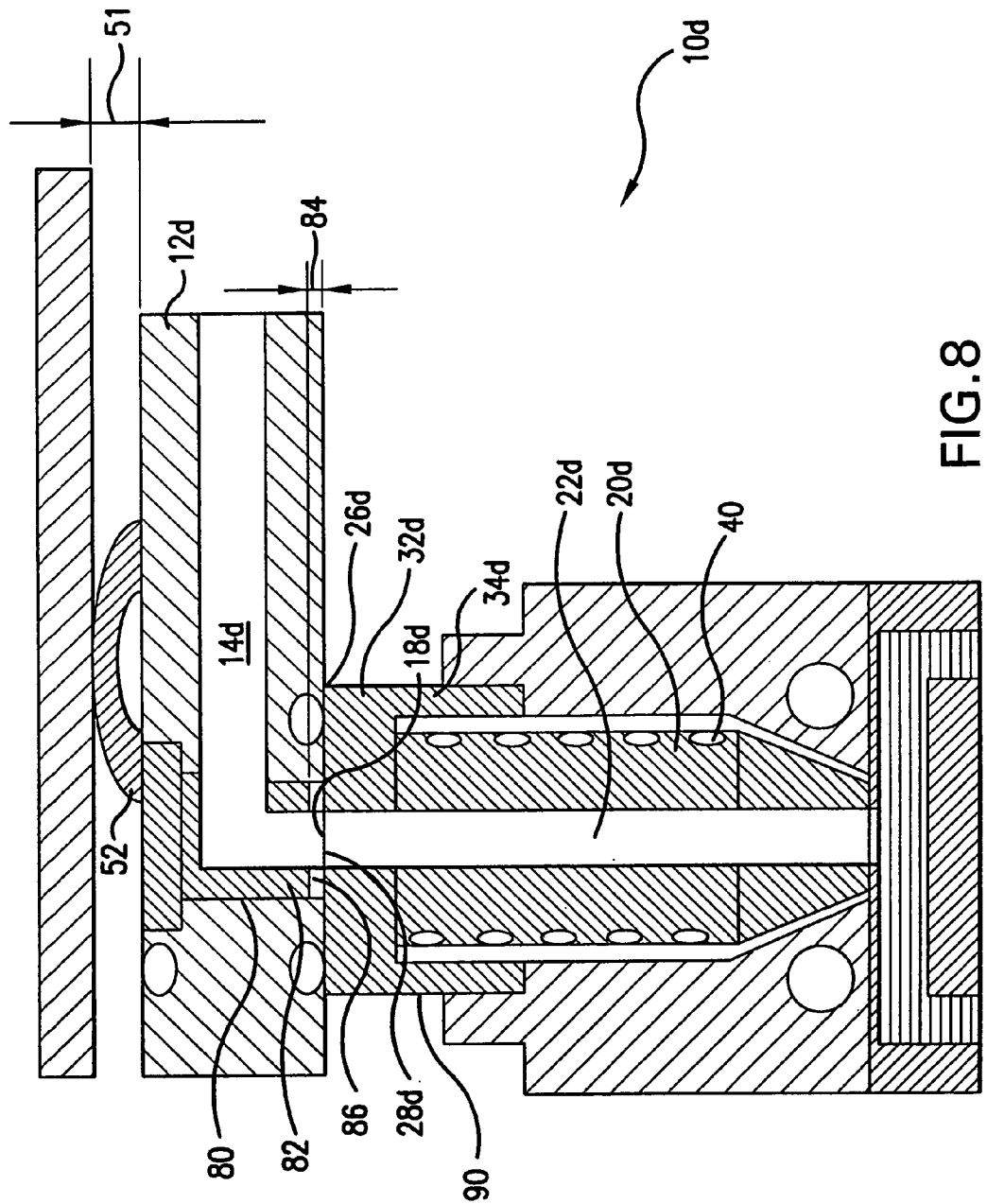
FIG. 8 is a side sectional view of a further embodiment of an injection molding apparatus of the present invention.

Referring to FIG. 8, a further embodiment of an injection molding apparatus 10d is shown in a cold, or non-operating condition. A manifold 12d includes a manifold channel 14d for delivering a melt stream through an outlet 18d to a nozzle channel 22d of a nozzle 20d. A collar 90 is provided between an upper surface 26d of the nozzle and an outlet surface 28d of the manifold 12d. The collar 90 includes a shoulder portion 32d and a spacing flange portion 34d.

A manifold plug 80 fits into a bore 82 in the manifold 12d and forms part of the channel 14d. The manifold plug 80 is press fit into the bore 82 in a manner that would be apparent to one of ordinary skill in the art. A cold clearance gap 84 is exists between a lower surface 86 of the manifold plug 80 and the outlet surface 28d of the manifold 12d. The manifold plug 80 behaves in a similar manner as the sealing insert 44 that has been previously described in relation to FIGS. 1–7. In addition, the manifold plug 80 is formed of similar materials.

Figure 9:
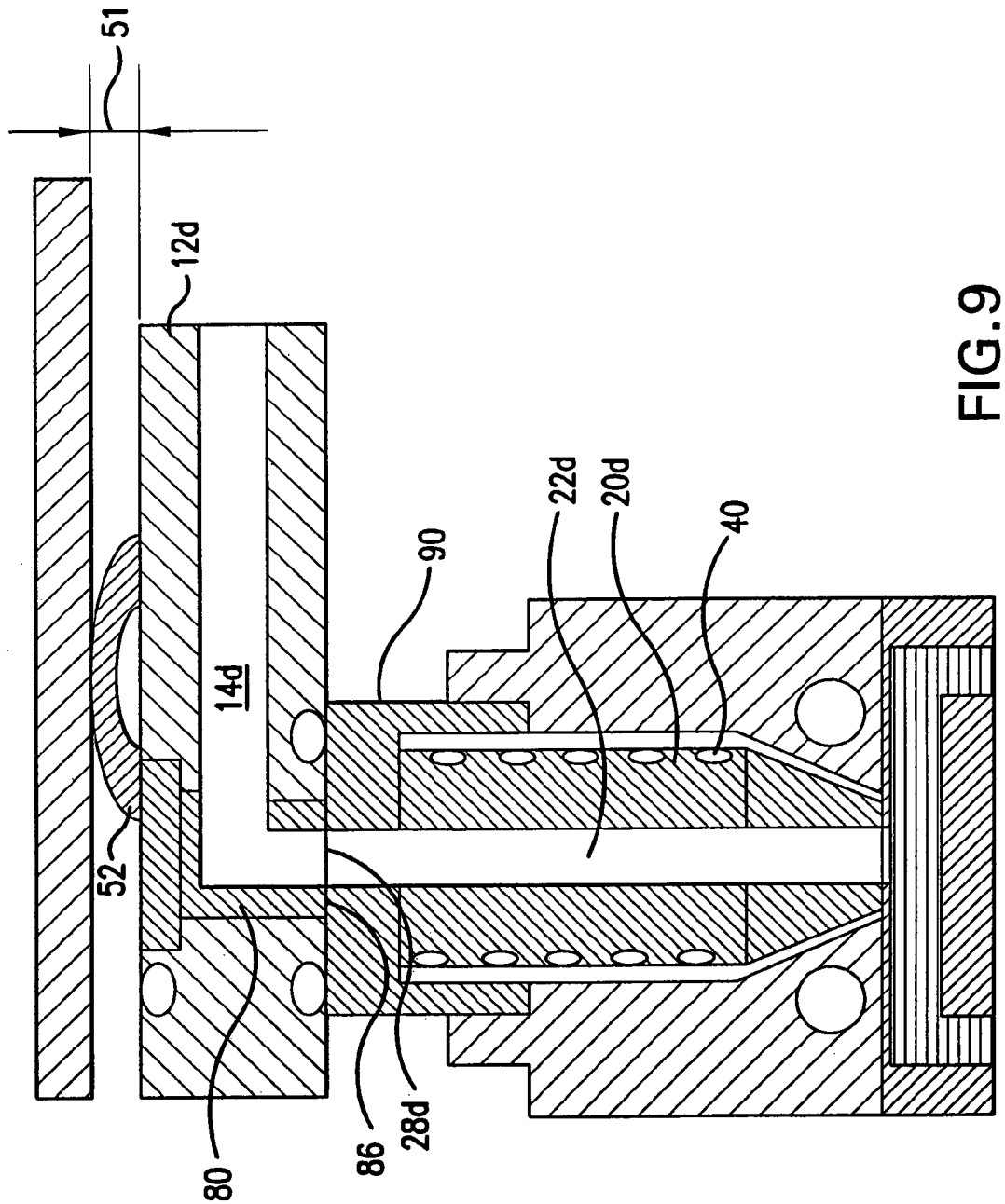
FIG. 9 is a side sectional view of the injection molding apparatus of FIG. 8 in the operating condition.

As the manifold 12d heats up to operating temperature, the manifold plug 80 lengthens to eliminate the cold clearance gap 84, as shown in FIG. 4, and apply pressure to the nozzle 20d, via collar 90. The operating condition, in which leakage between the manifold 12d and the collar 90 is reduced due to the manifold plug 80, is shown in FIG. 9.

Figure 10:
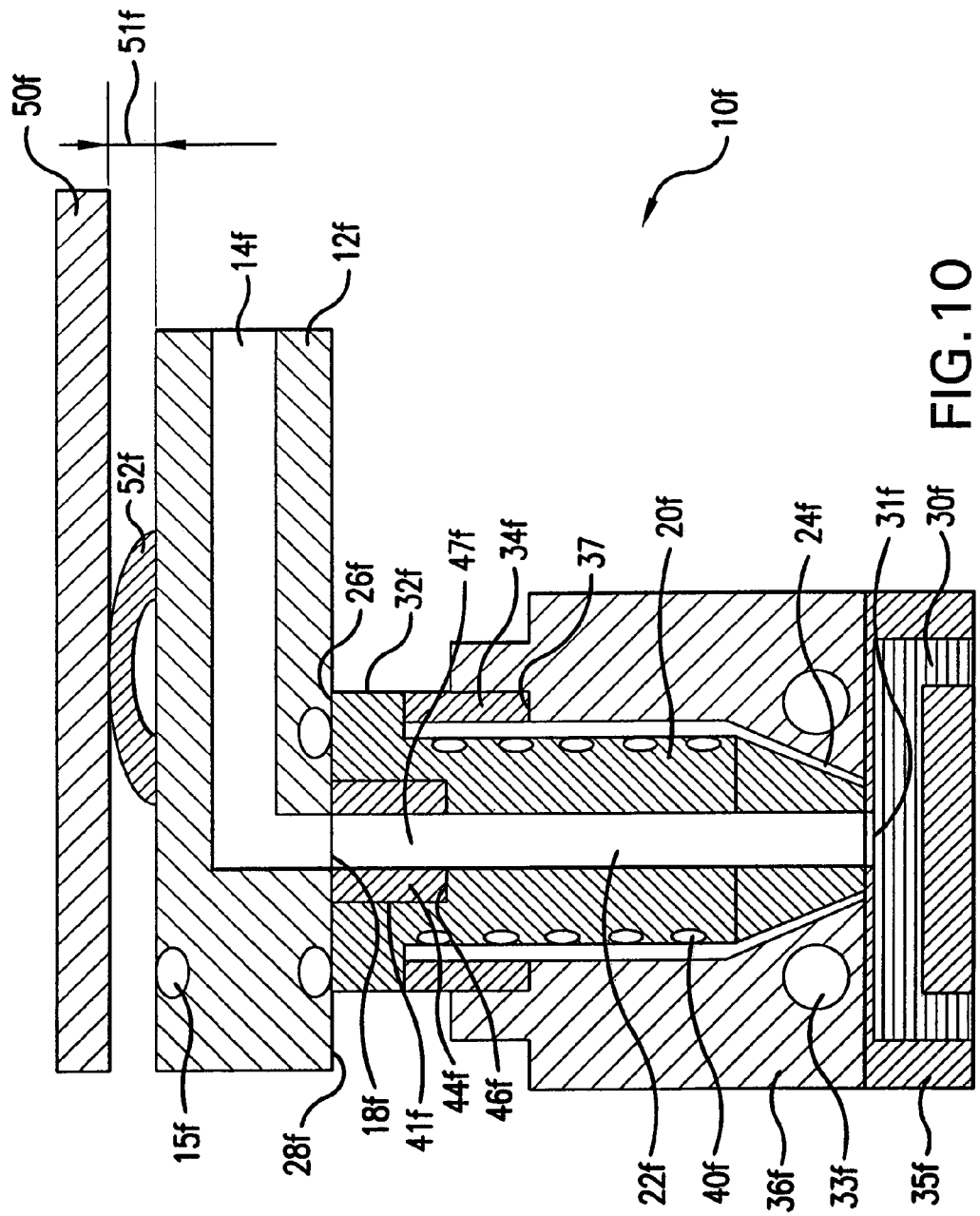
FIG. 10 is a side sectional view of a further embodiment of an injection molding apparatus of the present invention.

FIG. 10 shows a further embodiment of an injection molding apparatus 10f. The injection molding apparatus 10f is a multi-cavity injection molding apparatus having a plurality of nozzles 20f, which inject melt into a plurality of mold cavities 30f. FIG. 10 shows a single nozzle 20f and mold cavity 30f for simplicity. The injection molding apparatus 10f comprises a manifold 12f having a manifold channel 14f extending therethrough for receiving a melt stream of moldable material from a machine nozzle (not shown). The melt stream flows through the manifold channel 14f and is delivered to an outlet 18f of the manifold 12f. Manifold heaters 15f are provided in the manifold 12f to maintain the melt stream at a desired temperature.

A backing plate 50f is located adjacent the manifold 12f and is offset by a gap 51f. A spring 52f is provided between the backing plate 50f and the manifold 12f.

Nozzle 20f is located between the manifold 12f and the mold cavity 30f, which is formed in a mold cavity plate 35f. Each nozzle 20f includes a nozzle channel 22f for receiving the melt stream from the manifold outlet 18f and delivering the melt stream to the mold cavity 30f. A mold gate 31f is provided at the entrance to the mold cavity 30f, adjacent a tip 24f of the nozzle 20f. Each nozzle 20f is provided with one or more heaters 40f that help to maintain the melt stream at a desired temperature as it passes through the nozzle 20f.

A nozzle shoulder 32f is provided at an upper end of the nozzle 20f. The nozzle shoulder 32f includes an upper surface 26f, which abuts an outlet surface 28f of the manifold 12f. A spacer 34f is located between a lower surface of the nozzle shoulder 32f and a contact surface 37 of the manifold plate 36f. The spacer 34f is made of a low thermally conductive material such as titanium or ceramic, for example. As would be apparent to one of ordinary skill in the art, spacer 34f positions and aligns nozzle 20f with respect to manifold 12f and mold cavity 30f.

A manifold plate 36f abuts the mold cavity plate 35f. Cooling channels 33f extend through the manifold plate 36f adjacent the mold cavity 30f in order to aid in the cooling of melt therein.

The nozzle 20f includes a recess 41f that is formed in the upper surface 26f, or manifold contacting surface, of the nozzle 20f. The recess 41f is delimited by a shoulder 46f. A sealing insert 44f having a bore 47f is nested in the recess 41f. When the injection molding apparatus 10f is in the cold condition a clearance (not shown) is provided between the sealing insert 44f and the outlet surface 28f of the manifold 12f. The wall thickness of the sealing insert 44f is typically in the range of 2 to 3 mm.

The sealing insert 44f has a higher thermal conductivity than both the manifold 12f and the nozzle 20f, which are typically comprised of tool steels such as H13 or P20 steel, for example. The sealing insert 44f may be comprised of copper, beryllium copper, brass, carbide or some steels. Alternatively, any suitable material having a higher thermal conductivity than the manifold 12f and nozzle 20f may be used.

In operation, the injection molding apparatus 10f starts in the cold condition, in which all of the components are at generally the same ambient temperature. During operation, the manifold 12f and the nozzle 20f are heated and then maintained at their respective temperatures so that the melt stream may flow unhindered into the melt cavity 30f, which is chilled. As the injection molding apparatus 10f heats up to operating temperature (shown in FIG. 10) the sealing insert 44f expands. Because the sealing insert 44f has a higher thermal expansion coefficient, the length of the sealing insert 44f increases by a larger amount than the surrounding components, including the nozzle 20f and the manifold 12f. As such, the sealing insert 44f applies a sealing force to the outlet surface 28f of the manifold 12f. The expansion of the sealing insert 44f may, in fact, cause the upper surface 26f of the nozzle 20f and the outlet surface 28f of the manifold 12f to move apart slightly, however, fluid communication between the components is sealed. The bore 47f of the sealing insert 44f provides a continuous, sealed path for melt to flow between the manifold outlet 18f and the nozzle channel 22f.

Figure 11:
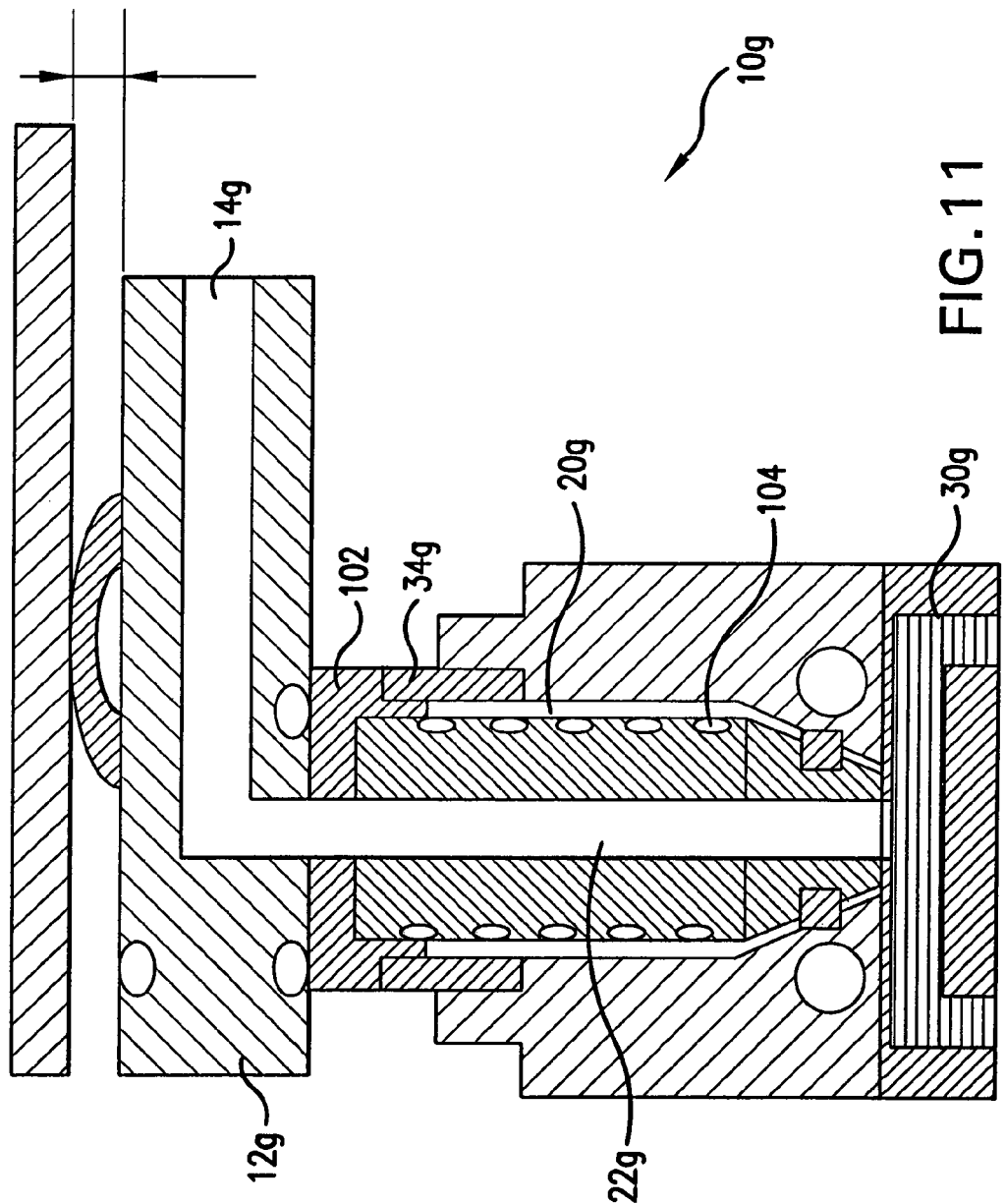
FIG. 11 is a side sectional view of a further embodiment of an injection molding apparatus of the present invention.

A further embodiment of an injection molding apparatus is generally shown at 10g of FIG. 11 in which a nozzle 20g having a nozzle body 104 and a nozzle head, or shoulder, 102 is shown. The nozzle head 102 operates similarly to the sealing insert 44 of the previous embodiments by expanding more than the surrounding components to produce a seal between manifold channel 14g of manifold 12g and nozzle channel 22g. The nozzle body 104 and nozzle head 102 are coupled together by brazing or a threaded connection, for example (not shown). In this embodiment, the head 102 can be made of different materials than the body 104. The head 102 is made of a material having higher thermal conductivity and is heated by manifold 12g. Spacer 34g is a separate part that is made of a material having low thermal conductivity. As would be apparent to one of ordinary skill in the art, spacer 34g positions and aligns nozzle 20g with respect to manifold 12g and mold cavity 30g.

Figure 12:
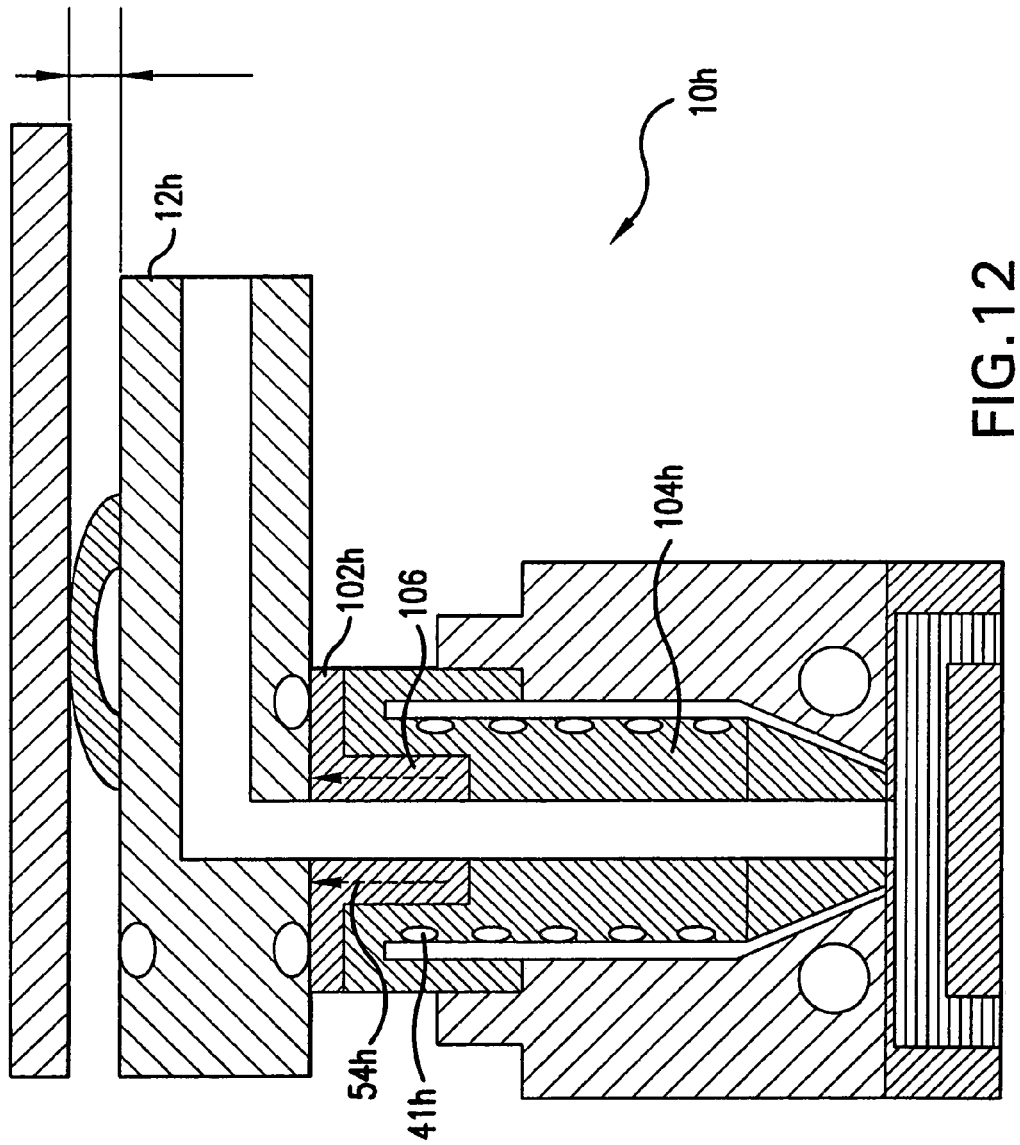
FIG. 12 is a side sectional view of still a further embodiment of an injection molding apparatus of the present invention.

FIG. 12 shows yet a further embodiment of an injection molding apparatus 10h. In this embodiment a nozzle head 102h includes a sleeve portion 106 that is nested in a recess 41h provided in a nozzle body 104h. The nozzle head 102h is made of a material having higher thermal conductivity than nozzle body 104h and is heated by manifold 12h. The injection molding apparatus 10h is shown in an operating condition and the nozzle head 102h exerts a sealing force 54h in a similar manner as the sealing inserts 44 of the previous embodiments.

Figure 13:
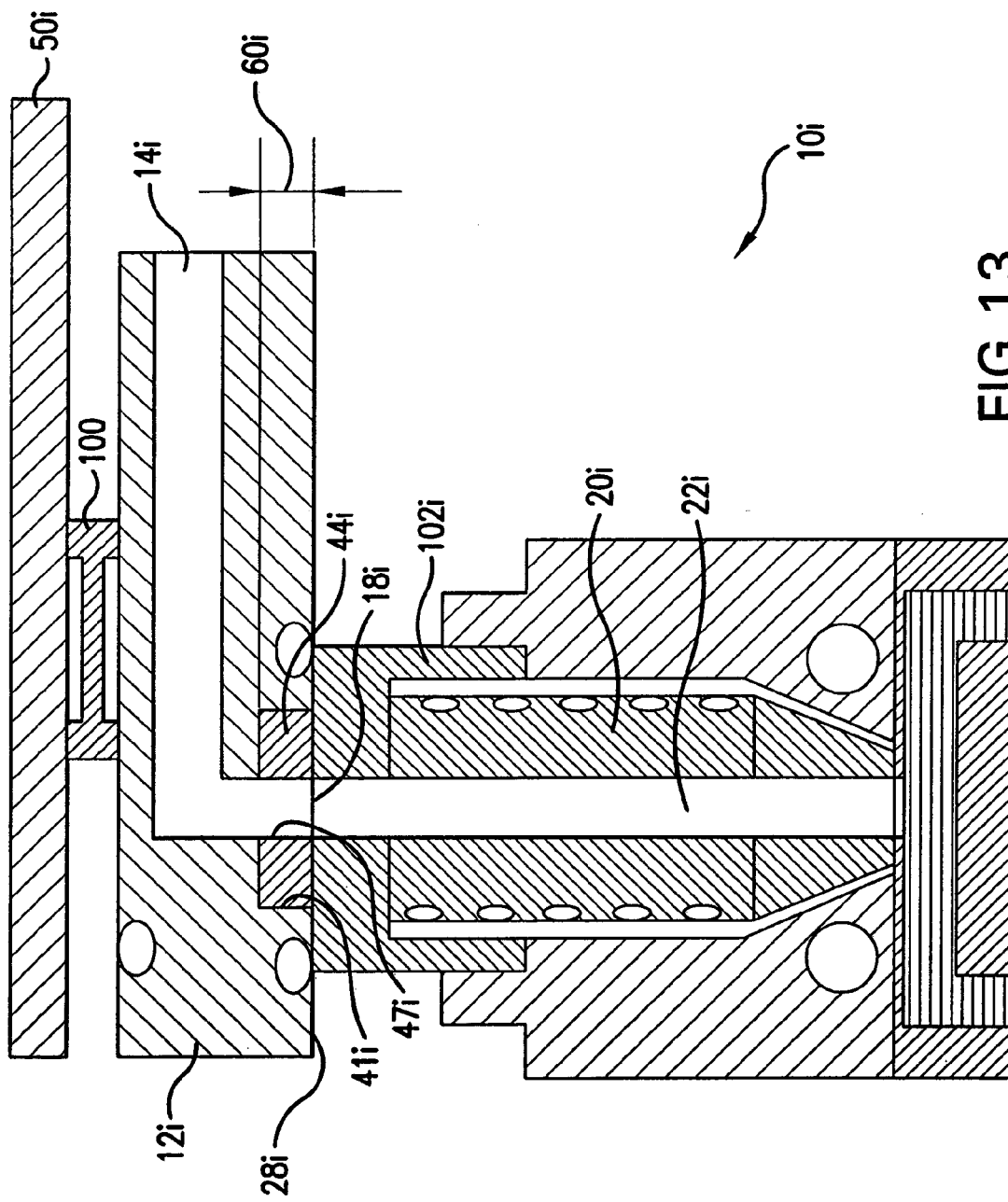
FIG. 13 is a side sectional view of a further embodiment of an injection molding apparatus.

Referring to FIG. 13, a further embodiment of an injection molding apparatus 10i is shown. A sealing insert 44i is mounted in a recess 41i that is formed in an outlet surface 28i of the manifold 12i. The recess 41i surrounds an outlet 18i of manifold channel 14i. The sealing insert 44i includes a bore 47i that is aligned with the manifold channel 14i to provide a continuous path between manifold channel 14i and nozzle channel 22i.

A spacer 100 separates the backing plate 50i and the manifold 12i. The spacer 100 is typically comprised of a thermal insulating material such as titanium or ceramic, for example. The spacer 100 performs a similar function as spring 52 of FIG. 2, however, because it is comprised of a thermal insulating material, the size of the gap between the manifold 12i and the backing plate 50i remains generally constant.

The injection molding apparatus 10i of FIG. 13 is shown in the operating condition. In this condition, the sealing insert 44i is in an expanded state in which the length 60i of the sealing insert 44i fills recess 41i and the sealing insert 44i exerts a sealing force on nozzle head 102i of nozzle 20i. The sealing insert 44i functions in a similar manner as the manifold plug 80 of FIGS. 8 and 9, which has been previously described.

Figure 14:
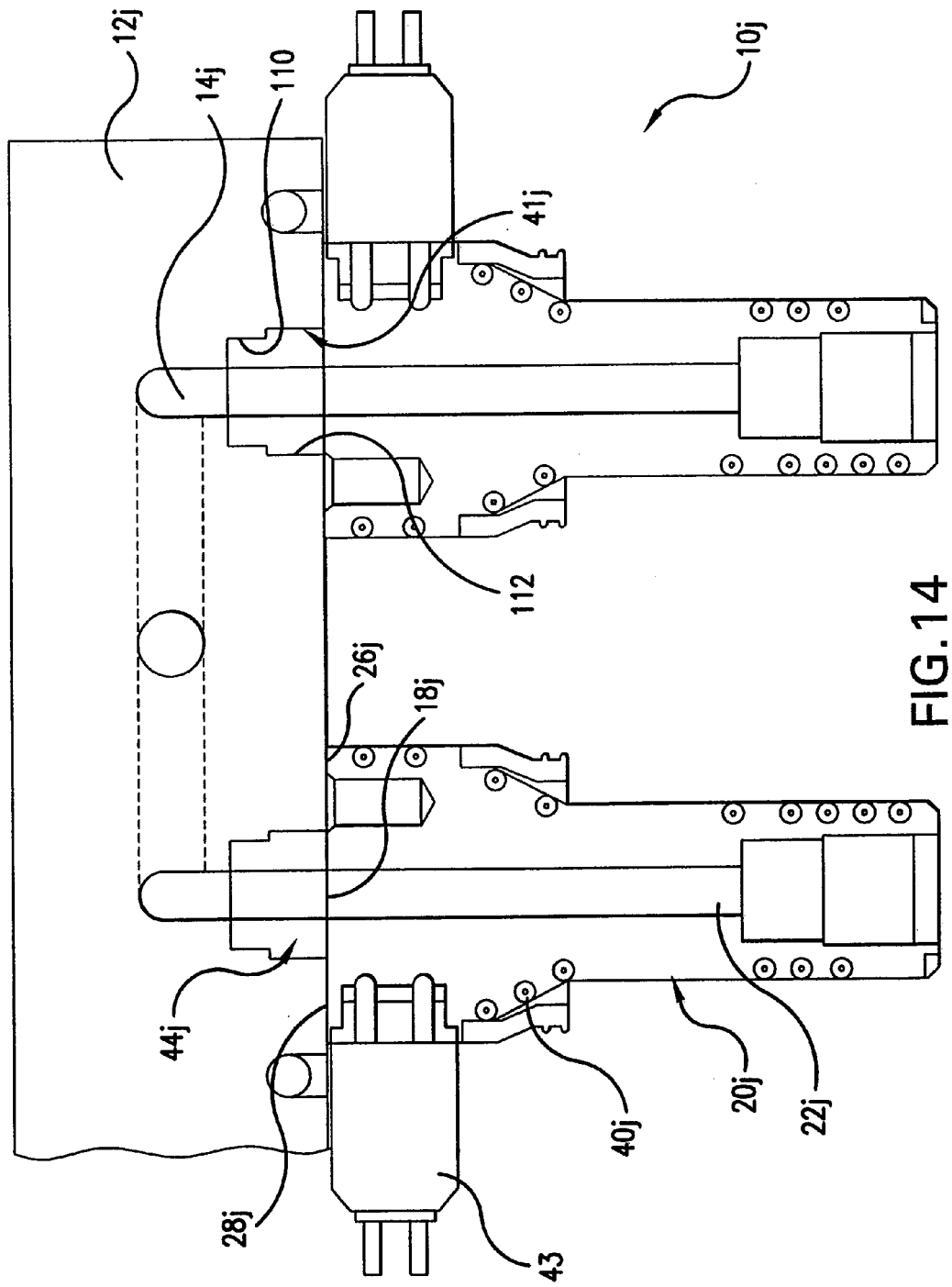
FIG. 14 is a side sectional view of a further embodiment of an injection molding apparatus.

A further embodiment of an injection molding apparatus 10j is shown in FIG. 14. In this embodiment, a manifold 12j having a manifold channel 14j extending therethrough receives a melt stream of moldable material from a machine nozzle (not shown). Nozzles 20j are provided adjacent the manifold 12j. Each nozzle 20j includes a nozzle channel 22j for receiving the melt stream from a respective manifold outlet 18j and delivering the melt stream through a nozzle tip (not shown) to a respective mold cavity (not shown). Each nozzle 20j is further provided with a heater 40j that is coupled to a connector 43. The heater 40j helps to maintain the melt stream at a desired temperature as it passes through the nozzle 20j.

Figure 16:
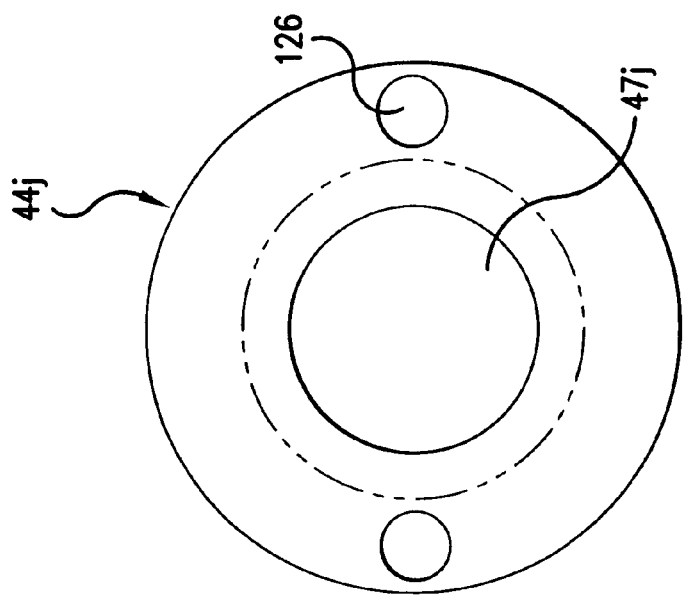
FIG. 16 is a cross-sectional view taken along on line A of FIG. 15.
Figure 15:
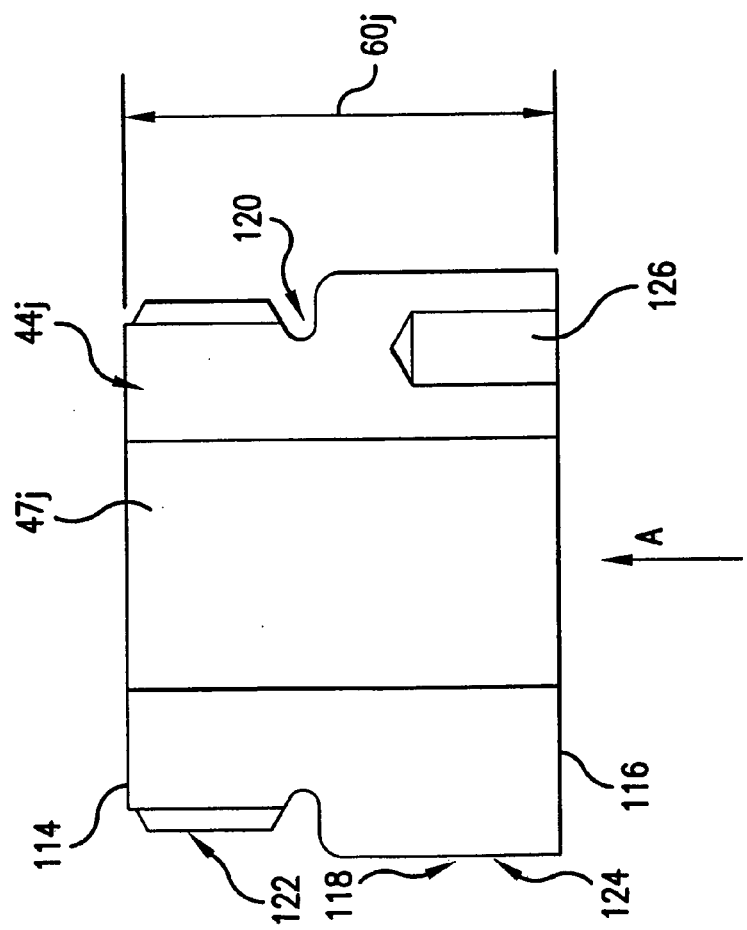
FIG. 15 is a side view of a sealing insert of the injection molding apparatus of FIG. 14.

The manifold 12j includes a recess 41j that is formed in the outlet surface 28j of the manifold 12j. The recess 41j is stepped and includes a first threaded portion 110 and a first generally smooth portion 112. The recess 41j is sized to receive a sealing insert 44j. The sealing insert 44j, which is shown in FIGS. 15 and 16, includes a first end surface 114, a second end surface 116 and a bore 47j that extends therethrough. An outer surface 118 of the sealing insert 44j includes a neck 120 that is provided between a second threaded portion 122 and a second generally smooth portion 124. The second threaded portion 122 of the sealing insert 44j is sized to mate with the first threaded portion 110 of the recess 41j to secure the sealing insert 44j to the manifold 12j. As shown, the sealing insert 44j further includes a pair of tooling apertures 126 (only one tooling aperture shown in FIG. 15) that are formed in the second end surface 116 thereof to allow for installation.

The sealing insert 44j and manifold 12j are arranged so that a cold clearance is provided between the sealing insert 44j and a mating surface 26j of the nozzle 20j. The sealing insert 44j is comprised of a material having a higher thermal conductivity than both the manifold 12j and the nozzle 20j. The sealing insert 44j may be comprised of copper, beryllium copper, brass, carbide or some steels. Any suitable material having a higher thermal conductivity than the manifold 12j and nozzle 20j may be used. The wall thickness of the sealing insert 44j is typically in the range of 2 to 4 mm.

In operation, the injection molding apparatus 10j starts in a cold condition, in which all of the components are at generally the same ambient temperature. During operation, the manifold 12j and the nozzle 20j are heated and then maintained at their respective temperatures so that the melt stream may flow unhindered into the melt cavity. The heated, or operating, condition is shown in FIG. 14. The sealing insert 44j responds to the temperature increase by expanding more than the manifold 12j and thus applying sealing force to the mating surface 26j of the nozzle 20j. Because the sealing insert 44j has a high thermal conductivity, the length 60j of the sealing insert 44j increases by a larger amount than the surrounding components. The pressure applied to the nozzle 20j by the sealing insert 44j is greater than the injection forces generated by the melt stream, which attempt to push the sealing insert 44j and the nozzle 20j apart and create a clearance for the melt stream to leak under pressure.

Although preferred embodiments of the present invention have been described, those of skill in the art will appreciate that variations and modifications may be made without departing from the spirit and scope thereof as defined by the appended claims.

We claim:

1. An injection molding apparatus comprising:
   a manifold having a manifold channel for receiving a melt stream of moldable material;
   a nozzle having a nozzle channel fluidly connected to the manifold channel and a recess formed in an upper surface; and
   a sealing element provided within the nozzle recess, the sealing element including a melt channel for receiving the melt stream from the manifold channel and delivering the melt stream to the nozzle channel, wherein a clearance is provided between the sealing element and the manifold in a cold condition.

2. The injection molding apparatus of claim 1, wherein the sealing element has a higher thermal expansion coefficient than both the nozzle and the manifold.

3. The injection molding apparatus of claim 2, wherein the sealing element abuts the manifold at an operating temperature to provide a seal between the sealing element and the manifold.

4. The injection molding apparatus of claim 3, wherein the sealing element is comprised of copper.

5. The injection molding apparatus of claim 3, wherein the sealing element is comprised of beryllium copper.

6. The injection molding apparatus of claim 3, wherein the sealing element is comprised of brass.

7. The injection molding apparatus of claim 1, wherein the sealing element is a cylindrical sleeve.

8. An injection molding apparatus comprising:
   a manifold having a manifold channel, the manifold channel having an inlet for receiving a melt stream of moldable material under pressure and an outlet;
   a nozzle having a nozzle channel fluidly connected the outlet of the manifold channel;
   a sealing element provided between the nozzle and the manifold, the sealing element including a melt channel for receiving the melt stream from the manifold channel and delivering the melt stream to the nozzle channel, wherein the sealing element has a higher thermal expansion coefficient than both the nozzle and the manifold, and wherein in a cold condition a clearance is provided between the sealing element and an outlet surface of the manifold; and
   a mold cavity for receiving the melt stream from the nozzle channel, the nozzle channel communicating with the mold cavity through a mold gate.

9. The injection molding apparatus of claim 8, wherein in an operating condition the sealing element abuts the outlet surface of the manifold to provide a seal between the sealing element and the manifold.

10. The injection molding apparatus of claim 9, wherein the sealing element is comprised of copper.

11. The injection molding apparatus of claim 9, wherein the sealing element is comprised of beryllium copper.

12. The injection molding apparatus of claim 9, wherein the sealing element is comprised of brass.

* * * * *